United States Patent Office 3,206,395
Patented Sept. 14, 1965

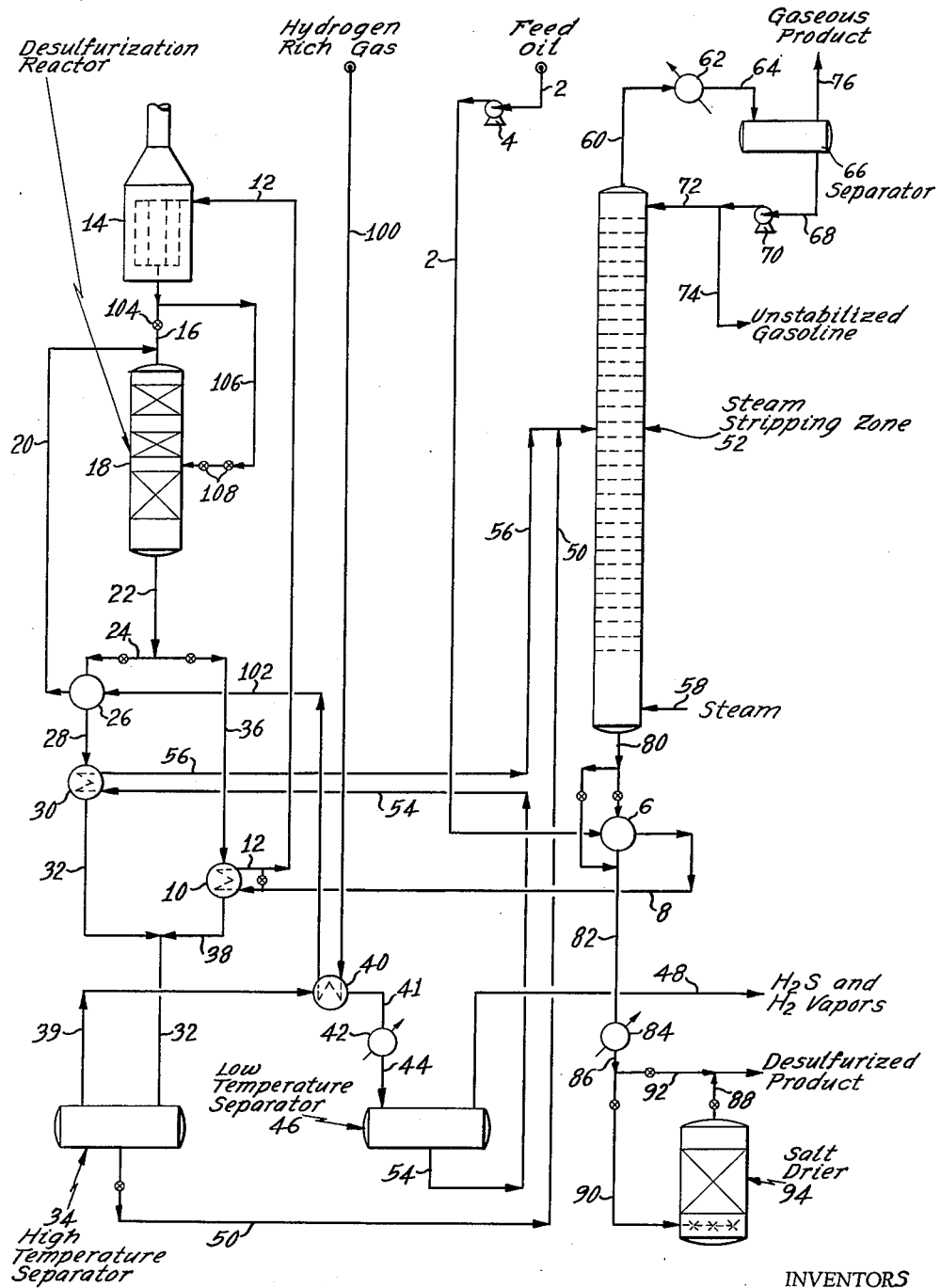

3,206,395
DESULFURIZATION PRODUCT RECOVERY
PROCESS
Charles E. Slyngstad, Oakland, Calif., and Frank L. Lempert, Rutherford, N.J., assignors to Pullman Incorporated, a corporation of Delaware
Continuation of application Ser. No. 820,360, June 15, 1959. This application Jan. 21, 1963, Ser. No. 252,946
3 Claims. (Cl. 208—353)

This application is a continuation of application Serial No. 820,360, filed June 15, 1959, now abandoned, and is a continuation-in-part of application Serial No. 759,284, filed September 5, 1958, now Patent Number 3,011,971.

This invention relates to an improved method and means for contacting a chemical compound in the presence of a hydrogen-containing gas under desired conversion conditions. In one aspect the invention is directed to the method and means for converting dissimilar hydrocarbons in the presence of hydrogen-containing gas under desired condition. More specifically, the invention is directed to the method of desulfurizing dissimilar hydrocarbon feed materials in the presence of hydrogen-rich gases in an apparatus which provides optimum simplicity, versatility and efficiency of operation.

The present invention has wide application for systems or processes in which various hydrocarbon materials are reacted in the presence of hydrogen-containing gases. Moreover, this invention is of particular importance for the improvement of desulfurization processes by virtue of the optimum versatility encompassed in the design for processing dissimilar hydrocarbon feed materials with efficient utilization of hydrogen-rich gases employed therein. In desulfurizing processes it is preferred to maintain a high ratio of hydrogen to sulfur-containing hydrocarbon since high hydrogen partial pressure in the reaction zone has a favorable influence on the efficiency of desulfurization, the life of the catalyst and the amount of carbon produced and deposited on the catalyst in the reaction. Furthermore, dissimilar hydrocarbon feed materials varying in sulfur content, such as straight run or cracked products of reaction, require desulfurization, in many instances, prior to further use or conversion. Moreover, such hydrocarbons require in some instances different severity of treatment to obtain the desired degree of desulfurization. By means of this invention, dissimilar hydrocarbon feed materials are efficiently desulfurized by a method and means of optimum versatility.

It is an object of this invention to provide a novel method and means of contacting a chemical compound with a hydrogen-containing gas to obtain a high degree of utilization of hydrogen.

Another object of this invention is to provide a method for converting dissimilar hydrocarbons in a single conversion zone in the presence of hydrogen-rich gases.

Still another object of this invention is to provide a desulfurization process of optimum versatility for processing sulfur-containing hydrocarbons.

Other objects and advantages of this invention will become apparent from the following description and explanation thereof.

The invention is practiced by providing a reaction zone containing a plurality of catalyst beds wherein a hydrogen-rich gas is passed sequentially through the catalyst beds in a reaction zone, a first hydrocarbon feed material is passed sequentially through said catalyst beds with said hydrogen-rich gas under desulfurizing conditions, a desulfurized product of said first hydrocarbon feed is recovered from the reaction zone, the first hydrocarbon reactant stream passed to the reaction zone is discontinued while the hydrogen-rich stream is continuously passed through the catalyst beds in the reaction zone, a second hydrocarbon reactant different from the first hydrocarbon reactant is introduced to the reaction zone for flow through only a portion of the catalyst in the reaction zone while the hydrogen-rich gas is continuously passed through the total mass of catalyst in the reaction zone whereby the second hydrocarbon feed is passed through only the desired portion of the catalyst of the reaction zone and a desulfurized second hydrocarbon feed is recovered from the reaction zone.

This invention contemplates a system which involves contacting a chemical compound with hydrogen under a wide variety of reaction conditions of space velocity, temperature and pressure conditions such as superatmospheric and/or subatmospheric temperature and/or pressures. In any of these applications it may be desirable, although not necessary, to maintain a specified ratio of hydrogen to chemical compound. By means of the present invention the desired ratio of hydrogen to chemical compound can be maintained at a relatively high value to the total amount of hydrogen and chemical compound which is charged to the process. In essence, this embodiment of the invention is accomplished by passing a chemical compound of the reactant in parallel flow through at least two separate reaction or contacting zones with the hydrogen-containing gas being passed serially through said contacting zone.

This invention contemplates in another embodiment an improved arrangement of process steps for the recovery of valuable liquid products from a product effluent stream containing vapor-liquid hydrocarbons and noncondensable gases which includes passing the product effluent stream at an elevated temperature and pressure through a plurality of heat exchange steps for partial cooling and then to the first of a series of at least two separation zones maintained at an elevated pressure and provided with cooling between the first and second separation zones. A major portion of the liquid product is recovered at an elevated temperature and pressure sufficient for passage directly to a fractionation zone without additional heating thereof, with the recovered liquid product of minor proportion being combined with the major liquid product stream after being heated by indirect heat exchange with a portion of the reactor product effluent stream. In this aspect the present invention is an improvement over the recovery system shown in U.S. Patent 2,840,513 as will more fully appear from the description of this aspect hereinafter set forth.

This invention has application to operation involving the conversion of a hydrocarbon in the presence of a hydrogen-containing gas such as for example, aromatization, hydrogenation, reforming, hydroforming, isomerization, cracking under hydrogen pressure, desulfurization, etc. Among the various processes which can utilize the method of the present invention to a particular advantage is found in the desulfurization of dissimilar hydrocarbon materials. Dissimilar hydrocarbons are intended to include those of the same or different boiling range having a different API gravity or such hydrocarbons referred to as straight run hydrocarbons and hydrocarbon factions obtained from catalytic reactions such as cracking. While it is true that certain desulfurization processes such as for example, autofining, are operated under conditions to effect a net production of hydrogen, nevertheless our invention can be used for any desulfurization system involving multi-reactors and employing hydrogen. This is especially true in the case of those desulfurization reactions in which a net consumption of hydrogen is obtained. Generally, for these kinds of systems or processes it is desired to maintain a high ratio of hydrogen to hydrocarbon and since the cost of manufacturing hydrogen is high, the incentive to improve the process in the direction of effecting efficient desulfurization by using lower ratios of hydrogen to hydrocarbon is exemplified by providing a process of maximum versatility for processing dissimilar sulfur-containing hydrocarbons under optimum conversion or desulfurizing conditions. Accordingly, the present invention is of special utility for desulfurizing dissimilar hydrocarbon feeds and effectng desulfurization processes in which a net consumption of hydrogen is effected and wherein it is desirable to maintain a high ratio of hydrogen to hydrocarbon in producing desulfurization.

In practicing the process of the present invention the chemical compound to be contacted with the hydrogen may be maintained in either a liquid, vapor or mixed liquid-vapor state under contacting or conversion conditions. In the case wherein a hydrocarbon is converted in the presence of a hydrogen-containing gas, the temperature of treatment may be varied from about 350° F. to about 1250° F., at a pressure of from about 1 atmosphere to about 4000 p.s.i.g., a weight space velocity of about .01 to about 25 measured as the pounds of hydrocarbon charged to the conversion zone per pound of catlyst present therein.

The catalyst to be used for the purpose of converting the hydrocarbon may be of any of those well-known in the prior art, such as for example, siliceous catlysts including silica-alumina, platinum-alumina type catalysts used in reforming or hydroforming, or desulfurization reactions may be conducted in the presence of chromia, molybdenum-trioxide, nickel-molybdate supported on alumina, or nickel-tungstate-alumina or cobalt-molybdate-alumina and nickel-cobalt-moylbdate catalysts.

The desulfurization reactions effected in accordance with the present invention may employ temperatures in the range of from about 550° F. to about 1000° F., preferably from about 600° F. to about 800° F., a pressure of from about 25 to about 2000 p.s.ig., preferably from about 300 to about 1000 p.s.i.g., a weight space velocity of about .05 to about 20, preferably from 0.5 to about 10. The hydrogen which is charged to the system may be from about 300 to about 20,000 standard cubic feet of hydrogen per barrel of oil feed.

The catalytic material may be any suitable desulfurization catalyst including those which are hydrogenation catalysts such that the sulfur impurities are either absorbed by the catalyst and/or hydrogenated to produce hydrogen sulfide, which is evolved as a product of the process. Other catalysts which also may be used for this purpose are for example, platinum and/or palladium supported on alumnia type catalysts, a Group VI metal compound including for example the oxide and/or sulfide of the left hand elements thereof, specifically chromia and/or molybdenum trioxide supported on alumina; the Group VI metal compound can be promoted with a compound of a metal of Group VIII having an atomic number not greater than 28, such as for example the oxides and/or sulfides of iron, cobalt and nickel. Another suitable class of catalysts are the heteropoly acids which have molybdenum, chromium, vanadium, and/or tungstic as the outer acid-forming element and phosphorous, silicon, germanium, platinum, etc., can be present as the central acid-forming element. Examples of the heteropoly acids are phosphomolybdic acid, phosphotungstic acid, either alone or supported on a carrier material such as for example silica-alumina.

The hydrocarbons to be desulfurized by means of the present invention include those referred to as straight run hydrocarbons or hydrocarbon products of cracking operations which include gasoline, naphtha, kerosene, gas oil, cycle stocks from catalytic cracking or thermal cracking operations, residual oils, thermal and coker distillates, etc. This also includes those special cuts of either straight run or catalytically cracked products which are referred to as cycle oil, stove oil, diesel fuels, etc. The sulfur concentration of these hydrocarbon stocks may vary from about .03 to about 10 percent by weight. It is also contemplated treating hydrocarbon stocks having a gravity of from about 20 to about 50 API and a sulfur concentration of from about 0.25 to about 6.0 percent by weight, such as for example, gas oil and light catalytically cracked cycle stock. However, it should be understood that other feed stocks or any combinations thereof may be processed in accordance with this invention. The initial boiling point of the hydrocarbon feed to the desulfurization process contemplated by this invention may vary from about 70° F. to about 800° F., and the end point may vary from about 250 to about 1050° F. at atmospheric pressure.

Since the desulfurization-hydrogenation reaction produces a small volume of naphtha as a by-product, the volume of the treated gas oil is somewhat less than that of the fuel oil. If the treated oil is to have a minimum sulfur content on a weight percent basis equal to one-tenth of that in the feed oil, the acual sulfur removal must be slightly greater than about 90 percent. In the case of a light cycle oil feed, this removal amounts to about 92 weight percent of the sulfur in the charge stocks. In order to accomplish the above, the following specific process conditions are employed.

| | |
|---|---:|
| Reactor inlet temperature _____° F__ | 700–750 |
| Reactor space velocity _____w./hr./w__ | 3.2 |
| Reactor pressure _____p.s.i.g__ | 900 |
| Recycle gas rate (excluding make-up gas) _____s.c.f.b__ | 1200 |
| Reactor flow direction _____ | Downwards |

As previously mentioned herein, the conditions under which the hydrogen-containing gas is contacted with the chemical compound include maintaining the chemical compound in a liquid, vapor, or mixed liquid-vapor state. Further, while maintaining the chemical compound or hydrocarbon in the liquid state, the contact with the hydrogen-containing gas may be effected under either concurrent or countercurrent conditions.

It is also contemplated within the scope of this invention of employing a multi-reactor system or a plurality of reactors suitably connected in order that the chemical compound or hydrocarbon to be treated in each reactor may be of the same or of different composition. That is, the hydrocarbon or hydrocarbons to be treated are passed in parallel flow arrangement through the reactors, whereas the hydrogen-rich gas flows serially through the plurality of reactors employed. Accordingly then, there may be at least two reactors or more in the process and the number may be as high as desired, depending upon the hydrocarbons to be treated, economics of the process, hydrogen available and desired rotation of hydrogen to chemical compound in a reactor. This, of course, is of material importance, particularly, in a process in which hydrogen is consumed. The amount of the chemical compound or hydrocarbon passed to each reactor may be the same or it may be varied in relatively large quantities or a different chemical compound may be passed to each reactor with the hydrogen-rich gas passed serially through the reactors. This, of course, depends upon the particular feed material to be treated and results desired, the only restriction being in that the clean or least contaminated hydrocarbon should be contacted first with the hydrogen-rich gas.

By means of the present invention, the process will operate with equal efficiency on any one or combination of the feed materials described herein. Table I below describes particular feed materials which may be successfully desulfurized by the process of this invention. Furthermore, hydrogen-containing gases of varying impurity, such as those obtained from a reforming process, may be successfully employed herein. Table II below gives the composition of two different hydrogen-rich gas streams which may be successfully employed in the process of this invention. Of course, it is to be understood that other hydrogen-rich gas streams of different composition may also be successfully employed in the present invention.

TABLE I
*Charge Stocks*

|  | Stove oil | Diesel base | FCC light cycle oil |
|---|---|---|---|
| Gravity, ° API | 42.0 | 34.0 | 27.0 |
| Color, ASTM | 25 | 16 |  |
| Flash, ° F | 125-150 | 140-200 | 140-200 |
| Sulfur, wt. percent | 0.8 | 1.5 | 2.0 |
| ASTM distillation, ° F.: |  |  |  |
| IBP | 360 | 374 | 350 |
| 10% | 390 | 520 | 405 |
| 50% | 440 | 570 | 482 |
| 90% | 510 | 600 | 588 |
| FBP | 540 | 620 | 615 |

TABLE II
*Feed Gas Compositions*

| Mole percent | Average purity | Maximum purity |
|---|---|---|
| $H_2$ | 84.9 | 93.7 |
| $C_1$ | 3.1 | 1.0 |
| $C_2$ | 2.1 | 0.7 |
| $H_2S$ | .8 | 0.8 |
| $C_3$ | 1.9 | 0.8 |
| $C_4$ | 4.8 | 2.0 |
| $C_5$ | 1.2 | 0.5 |
| $C_{6+}$ | 1.2 | 0.5 |
| Total | 100.0 | 100.0 |

In accordance with one embodiment of the present invention, the reactor is provided with a plurality of separate fixed catalyst beds within the reactor shell containing substantially equal quantities of catalyst in each bed amounting to from about 10 percent to about 20 percent of the total mass of catalyst within the reactor. By this arrangement, the particular feed to be treated may be passed in contact with any desired quantity or portion of the catalyst within the reactor under selected reaction conditions. In another embodiment, the reactor contains at least three catalyst beds with the two upper catalyst beds containing approximately equal quantities of catalyst in each bed and the lowermost bed containing a quantity of catalyst at least equal to the total quantity of catalyst in the remaining catalyst beds.

It is also contemplated within the scope of this invention to employ a plurality of separate catalyst beds in the reactor with each bed containing a different quantity of catalyst. In this embodiment, generally, the quantity of catalyst in each catalyst bed will increase in the direction of flow of reactant material. The catalyst beds are retained as fixed catalyst beds between suitable perforated grids or foraminous members which will permit flow of reactant materials and for chemical compounds sequentially through the catalyst beds in the reactor shell. Provisions are made for introducing feed material to any portion of the catalyst beds in the reactor, as well as means for introducing a suitable quench material, such as gas or oil, which may be a recycle gas or oil between the catalyst beds, to effect a means of temperature control of the reaction within desired limits. As previously stated, provisions are made for introducing a desired hydrocarbon reactant material between any one of the catalyst beds for flow of the hydrocarbon reactant through a portion of the catalyst within the reactor chamber as desired while the hydrogen-rich gas is passed continuously and sequentially through the total mass of catalyst or catalyst beds within the reactor chamber. By this arrangement, a hydrocarbon reactant or chemical compound may be processed at any multiple of the space velocity amounting to from about 1 to about 10 times the space velocity for the total catalyst inventory under desired temperature and pressure conditions. Furthermore, by this arrangement, dissimilar reactant materials may be contacted under varying severity conditions of operation. Moreover, this arrangement lends itself to a system of optimum flexibility and versatility for processing dissimilar hydrocarbon reactants, particularly for the desulfurization of sulfur-containing hydrocarbons. More specifically, a reactant material comprising a fluid catalytic cracking light cycle oil having a low API gravity of about 27 API or a diesel base feed material having an API gravity of about 34 may be desulfurized at a space velocity below about 3.4 w./hr./w. to remove at least about 90 percent of its sulfur content by passing the cycle oil with the hydrogen through the total mass of catalyst in the reactor. In addition, a reactant or feed material of higher API gravity of about 42.0 API, such as a stove oil, may be effectively desulfurized without color change by passing the material in contact with only a desired portion of the catalyst mass, say about one half or less than one half of the total catalyst mass in the presence of hydrogen while the hydrogen-rich stream is passed through the total catalyst mass. Accordingly, the space velocity will be increased at least twice that employed when using the total quantity of catalyst in the reactor. In this latter arrangement, the passage of the hydrogen-rich gas through the total mass of catalyst in the reactor prevents or excludes the passage of vapors from the higher API gravity material from entering into the remaining portion of the catalyst in the reactor. When treating a higher API gravity material in this manner, an advantage is achieved during the desulfurization of the feed material in that the process may be carried out at much higher space velocity conditions above about 6.0 w./hr./w., such that there is no degradation of the feed color. Accordingly, the space velocity may be controlled over a wide range as hereinbefore indicated by introducing the feed or reactant material at various points of the total mass of catalyst within the reactor in order that the hydrocarbon feed passes through only the desired portion of the catalyst mass, while the hydrogen-rich stream passes through the total mass of catalyst in the reactors.

One of the primary advantages in the process design of this invention resides in the design of the reactor effluent heat exchange system to provide efficient utilization of available heat with consequent savings in utility expenses while at the same time using a minimum of costly alloy steel, such as stainless steel surfaces. Optimum use of alloy surface in the reactor effluent heat exchange train or system has been achieved by splitting the effluent at the reactor outlet and using one branch to heat feed oil in heat exchanger 10, while using the other branch or portion of the stream to heat recycles gas in heat exchanger 26 and provides stripper preheat in heat exchanger 30. The stripper preheat is controlled by regulating the quantity of effluent passed through each stream. If the necessary effluent split results in too low a temperature, for example, in separator drum 34, feed oil may then bppass the cold side of heat exchanger 10 until the desired drum temperature is obtained. However, should the separator drum 34 become too high, a quantity of the stripper bottoms may be bypassed around heat exchanger 6, thus forcing the feed oil to absorb more heat in heat exchanger 10 and consequently lowering the temperature in separator drum 34. Additional surface has also been provided in cooler 84 to provide for adequate final cooling of the stripper bottoms regardless of the heat absorbed in exchanger 6. Furthermore, sufficient surface is included in the heat exchange system in order that the reactor outlet temperature may be varied from a minimum of about 650° F. to about 800° F.

An additional advantage resides in the process of this invention in that the recycle gas is heated to from about 570° F. to about 600° F. by heat exchange with the reactor effluent, thereby reducing the need to further heat this stream in a separate furnace. This, therefore, eliminates the requirement for protecting furnace tubes against hydrogen sulfide and hydrogen whereby the tubes may be formed from a less expensive material with consequent savings in investment.

In addition to the above, a particular advantage resides in the combination of a multi-temperature flash drum system in cooperation with a low pressure steam stripper. For example, the two drum reactor effluent flash system 34 and 46 provides the greater part of the stripper feed at an elevated temperature of about 450° F. and utilizes a small amount of a 125° F. stream to absorb a slight amount of additional preheat required for the efficient operation and control of the stripper tower. This system, therefore, precludes any necessity for cooling the entire reactor effluent to a low level of about 125° F. and thus expensive and inefficient reheating of the entire tower feed is eliminated.

In accordance with one embodiment of this invention a particular advantage resides in the combination of a multi-temperature flash drum system or separattor system in cooperation with the reactor effluent heat exchange system and a low pressure steam stripper or fractionator. That is, an improved arrangement of process steps is provided for the separation of the reactor product effluent comprising vapor-liquid hydrocarbons and non-condensable gaseous materials including hydrogen and hydrogen sulfide. For the purpose of this invention "non-condensable product material" and "non-condensable gaseous material" is intended to include any material either hydrocarbon or non-hydrocarbon in nature which is not a liquid under the conditions and within the range of temperatures and pressures disclosed herein.

Prior to commencing the separation process of this invention, the product effluent recovered at an elevated temperature and pressure from a desulfurization reactor is passed through a series of heat exchange steps as more fully described hereinbefore wherein the fresh hydrocarbon feed and hydrogen-rich recycle gases are preheated and the temperature of the product effluent stream is reduced to a temperature below about 700° F. and preferably to a temperature of from about 400° F. to about 500° F., say about 450° F. The product effluent now existing as a mixture of liquid and vaporous hydrocarbons containing hydrogen sulfide and low-boiling hydrocarbons is passed to the first of a series of at least two separation zones or accumulation zones wherein a vaporous phase is separated from a liquid phase and from which the phases are separately withdrawn. Since at least a part or substantially all of the hydrogen present in the vapor phase is desirably recycled to the desulfurization step or steps it is particularly desirable to maintain the pressure of this material as high as possible so as to minimize compressor requirements and cost. To accomplish this end the operation is conducted so as to minimize the pressure drop, but provide sufficient pressure drop for flow of the product effluent stream through the plurality of steps including the heat exchange steps, the series of separation steps and the steps required to recover a hydrogen-rich gaseous stream. Vaporous material recovered from the first separation zone of the series comprising a mixture of hydrogen, hydrogen sulfide and vaporous hydrocarbons is cooled to a temperature below about 150° F. and preferably about 125° F., without substantially reducing in pressure thereof and passed at an elevated pressure to the second separation zone in the series. As a result of this cooling an additional quantity of the vaporous hydrocarbons are condensed and recovered as liquid hydrocarbons from the second separation zone as a minor liquid product stream. The composition of the non-condensable gaseous material or vaporous material separated from the second separation zone comprising hydrogen, hydrogen sulfide and vaporous low-boiling hydrocarbons will be set by the temperature and pressure at which the second separation zone is maintained. The gas or vaporous material recovered from the second separation zone is then treated with suitable recovery equipment, not shown, such as an amine treater for the recovery of a hydrogen-rich gas stream at an elevated pressure having less than about 5 weight percent hydrogen sulfide therein.

The liquid product of minor proportion recoverd from the second separation zone in the series being at an elevated pressure and of reduced temperature is passed in indirect heat exchange with a major portion of the product effluent in the reactor effluent heat exchange system whereby the liquid product is heated to an elevated temperature sufficient for combining with the recovered liquid product stream of major proportion without substantially cooling the same. The combined recovered liquid product stream is then passed at an elevated temperature, for example a temperature of from about 400° F. to about 450° F. and a reduced pressure substantially the same or slightly above that employed in the steam stripper as a result of passing through a pressure reducing valve directly without further heating to a steam stripping or fractionating zone of reduced pressure to supply the major portion of the heat duty required therein.

The steam stripper operated at an average temperature within the range of from about 300° F. to about 600° F. and a pressure of about atmospheric to 100 p.s.i.g. provides a means for removing hydrogen sulfide from the treated hydrocarbon and at the same time permits control of the ASTM initial boiling point of this product. By using steam as the stripping medium in the lower portion of the tower the use of expensive alloy reboilers is also eliminated. Furthermore, the lower temperature inherent in the steam stripper also substantially eliminates the problem of degrading product color by excessive reheating.

Referring now to the drawing, by way of example, a cycle oil feed obtained from a catalytic cracking operation and having an API gravity of about 27.0 is supplied by means of conduit 2 at a rate of about 8000 b.p.s.d. The cycle oil contains about 2 percent by weight of sulfur and it is desired by the process of this invention to reduce the sulfur concentration at least 90 percent. The cycle oil feed is passed by conduit 2 containing pump 4 to heat exchanger 6 at a temperature of about 60° F. and is passed in indirect heat exchange with products of reaction more fully described hereinafter, whereby the temperature of the feed is raised to about 257° F. Thereafter the feed is passed by conduit 8 to a second indirect heat exchanger 10 for indirect heat exchange with a portion of the reaction effluent stream to further elevate the temperature of the cycle oil feed to about 660° F. The cycle oil feed at this elevated temperature is then passed by conduit 12 to a furnace 14 wherein the cycle oil is further heated to a temperature of from about 740° F. to about 800° F., depending upon the reactor outlet temperature desired. The thus heated cycle oil leaves furnace 14 by conduit 12 for introduction into the reaction zone 18. Hydrogen-rich gas which has been heated by indirect heat exchange means, as herein described, to an elevated temperature of about 600° F. is admixed with the cycle oil feed to be desulfurized prior to entering the reaction zone. In this particular embodiment, the hydrogen-rich gases at an elevated temperature of about 600° F. are passed by conduit 20 for admixture with the cycle oil in conduit 16 to provide a mixture having a temperature of about 750° F., and thereafter the mixture is passed to the reactor 18 to be passed in contact with the mass of catalyst therein.

In this specific embodiment the reactor is provided with three separate catalyst beds in which the two upper beds have equal portions of catalyst therein and the lowermost bed has a quantity of catalyst at least equal to the total amount of catalyst in the upper two catalyst beds. The mixture of cycle oil and hydrogen is passed through the reactor in contact with granular cobalt-molybdate catalyst supported on aluminum. This catalyst comprises approximately 2.5 percent by weight of cobalt oxide and about 14.0 percent by weight of molybdenum oxide. The hydrogenation of the sulfur compounds to produce hydrogen sulfide, as well as hydrogenation of some of the hydrocarbon constituents, involves both endothermic and exothermic reactions; consequently, depending upon the degree of hydrogenation there may be a temperature rise within the reactor 18 due to exothermic reaction. In order to control reaction temperature, provisions are made for introducing a quench oil between catalyst beds such as between the first and second or uppermost catalyst beds. The desulfurized product and entrained hydrogen-rich stream are removed from the bottom of the reactor 18 by conduit 22 at a temperature of about 800° F.

The product effluent stream comprising desulfurized hydrocarbon, hydrogen-rich gas, as well as hydrogen sulfide formed during the desulfurization reaction, is then split into two streams such that a portion of the product effluent stream is passed by conduit 24 to heat exchanger 26 to reduce the temperature of the stream to about 630° F. This stream will comprise a vapor and liquid stream in which the vapor will amount to about 17,610 pounds per hour, whereas the liquid stream will amount to about 1046 b.p.s.d. and will have an API gravity of about 29.7. This stream is then passed by conduit 28 to heat exchanger 30 for additional heat removal, and thereafter the stream is passed by conduit 32 to separation drum 34. The remaining portion of the product effluent stream is passed by conduit 36 to heat exchanger 10 and conduit 38 for admixture with the product effluent stream passed by conduit 32 to separation drum 34. Separation drum 34 is maintained at a pressure of about 867 p.s.i.g. and a temperature of about 450° F.

In separation drum 34 a gaseous stream comprising about 59.2 mole percent hydrogen and 18.8 mole percent hydrogen sulfide and amounting to about 33,097 pounds per hour is withdrawn by conduit 39 and passed to heat exchanger 40 wherein the temperature of the stream is reduced to about 332° F. This stream is then passed by conduit 41 to a cooler 42 and then by conduit 44 to separation drum 46 maintained at a pressure of about 850 p.s.i.g. and a temperature of about 125° F. In separation drum 46 a vaporous stream amounting to about 12,461 pounds per hour and comprising 68 mole percent hydrogen and 19.4 mole percent hydrogen sulfide is withdrawn by conduit 48 and passed to a suitable treating step, now shown, for the separation of hydrogen sulfide from a hydrogen-rich stream, which then may be reused in the process. In separation drum 34, a liquid stream amounting to about 6770 b.p.s.d. and having an API gravity of about 30.4 is withdrawn by conduit 50 and passed to a steam stripping tower 52. A liquid stream is also withdrawn from separating drum 46 which amounts to about 1670 b.p.s.d. having an API gravity of about 35.1 is withdrawn by conduit 54 and passed to heat exchanger 30 wherein the temperature of the stream is elevated to about 405° F. Thereafter this stream at an elevated temperature is passed by conduit 56 for admixture with the liquid product effluent in conduit 50 and passed to the steam stripper 52. The combined streams at a temperature of about 435° F., from conduits 56 and 50 contain vaporous material amounting to about 4900 pounds per hour and liquid material amounting to about 7980 b.p.s.d. having an API gravity of about 29.9. The combined stream is then passed to the steam stripping tower for separation of a desulfurized product stream from the remaining portion of the product effluent stream.

In steam stripper 52, steam at a temperature of about 450° F. and a pressure of about 175 p.s.i.g. is introduced at a rate of about 4050 pounds per hours to the bottom of the column by conduit 58. In the steam stripping tower 52, unstabilized gasoline and gaseous material is stripped from the desulfurized product, removed from the top of the tower by conduit 60 at a temperature of about 277° F. This stream contains about 4050 pounds per hour of steam and hydrocarbons amounting to about 24,765 pounds per hour. This stream is passed by conduit 60 to a cooler 62 and then passed by conduit 64 to separating drum 66 maintained at a temperature of about 90° F. and a pressure of about 15 p.s.i.g. In separating drum 66, unstabilized gasoline product is separated from a gaseous product and removed therefrom by conduit 68 containing pump 70. This liquid stream is then split such that a portion of the stream amounting to about 1465 b.p.s.d is passed by conduit 72 as reflux to the tower. The remaining portion of the stream amounting to about 319 b.p.s.d. or about 3737 pounds per hour and having an API gravity of about 44.4 is withdrawn by conduit 74 for further treatment. The gaseous product is withdrawn from separation drum 66 by conduit 76 and may be passed to suitable recovery equipment, not shown, to obtain a hydrogen-rich gaseous stream for further use in the process. Referring back to the stripper, the stripped desulfurized product is withdrawn from the bottom of the stripping tower by conduit 80 at a temperature of about 360° F. and passed to heat exchanger 6 wherein the temperature is reduced to about 250° F., by being passed in indirect heat exchange with feed material.

Provisions are also made by bypassing heat exchanger 6 with desulfurized product withdrawn from the bottom of the stripper. Thereafter the desulfurized product is passed by conduit 82 to cooler 84 to reduce the temperature to about 100° F. and the cooled desulfurized product may then be passed by conduit 86 containing pump 88 to a suitable salt drier 94 by conduit 90 or the desulfurized product may bypass the salt drier and be withdrawn as product of the process by conduit 92. Referring now back to the hydrogen feed stream, fresh hydrogen-rich gas containing about 85 mole percent hydrogen and about 1.9 mole percent hydrogen sulfide at a rate of about 3080 pounds per hour is admixed with hydrogen-rich recycle gas to provide a hydrogen stream comprising about 72.3 percent hydrogen. This stream, amounting to about 15,295 lb./hr. is passed by conduit 100 at a temperature of about 150° F. and a pressure of about 1010 p.s.i.g. to heat exchanger 40 wherein the temperature of the hydrogen-rich gas is raised to a temperature of about 400° F. by being passed in indirect heat exchange with the vaporous material in conduit 36 recovered from product effluent separating drum 34. The thus heated hydrogen-rich gas is then passed by conduit 102 to indirect heat exchanger 26 wherein the temperature of the stream is further elevated to a temperature of about 600° F. by being passed in indirect heat exchange with product effluent in conduit 24. The thus heated hydrogen-rich gas is then passed by conduit 20 to reactor 18 as hereinbefore discussed.

When processing a hydrocarbon feed material such as a stove oil, for example, under desulfurizing conditions without degradation of color, the stove oil having an API of about 42.0 is passed through only about one half of the total mass of catalyst in the reactor. By closing valve 104 and passing the stove oil feed through conduit 106 containing valve 108, the stove oil is introduced to the reactor between the middle and bottom catalyst beds. In this embodiment the hydrogen-rich gases introduced by conduit 20 are continuously passed downwardly through the upper catalyst beds in the reactor to be admixed with the hydrocarbon introduced by conduit 106 and passed through the lower catalyst bed under desulfurizing conditions. By this method of operation, the hydrogen-rich gases continuously pass through the total catalyst mass keeping it clear of hydrocarbon vapors, as well as effecting a partial regeneration of the upper catalyst beds simultaneously with desulfurization of the feed in the lower portion of the reactor. In addition, this prevents the upper catalyst beds from being contaminated with vapors of the stove oil feed. The products of reaction are then removed from the bottom of the reactor by conduit 22 as hereinbefore described. Provisions are also made, although not specifically shown, for the addition of a suitable quench liquid between catalyst beds to control the exothermic reaction temperature as desired.

Table III below presents the results obtained when treating an FCC light cycle oil feed described in Table I in accordance with this invention.

Table IV below presents the results obtained when treating a stove oil described in Table I in accordance with this invention.

TABLE III

*Material balances*

MATERIAL BALANCE FCC LIGHT CYCLE OIL FEED

|  | Feed | | Products | | |
| --- | --- | --- | --- | --- | --- |
|  | Cycle oil | Feed gas | Gas | Gasoline | Prod. oil |
| Vol. percent on feed | 100.0 |  |  | 5.0 | 95.0 |
| B.p.s.d | 8,000 |  |  | 400 | 7,590 |
| ° API | 27.0 |  |  | 37.8 | 28.5 |
| Lb./gal | 7.43 |  |  | 6.96 | 7.36 |
| G.p.h | 14,000 |  |  | 700 | 13,260 |
| Lb./hr | 104,000 | 3,080 | 4,594 | 4,877 | 97,609 |
| Sulfur, wt. percent | 2.0 |  |  | .02 | 0.2 |
| Sulfur, lb./hr | 2,080 |  | 1,921 | 1 | 158 |
| S.c.f.b |  | 400 | 168 |  |  |

TABLE IV

MATERIAL BALANCE STOVE OIL FEED

|  | Feed | | Products | | |
| --- | --- | --- | --- | --- | --- |
|  | Stove oil | Feed gas | Gas | Gasoline | Prod. oil |
| Vol. percent on feed | 100.0 |  |  | 3.0 | 96.9 |
| B.p.s.d | 8,000 |  |  | 258 | 7,750 |
| ° API | 42.0 |  |  | 50.0 | 43.0 |
| Lb./gal | 6.79 |  |  | 6.49 | 6.75 |
| G.p.h | 14,000 |  |  | 451 | 13,550 |
| Lb./hr | 95,000 | 1,269 | 1,836 | 2,927 | 91,506 |
| Sulfur, wt. percent | 0.8 |  |  | 0.2 | .07 |
| Sulfur, lb./hr | 760 |  | 698 | 1 | 61 |
| S.c.f.b |  | 165 | 90 |  |  |

Having thus described our invention and presented specific working examples thereof, it is to be understood that various modifications may be made thereto without departing from the scope thereof.

What is claimed is:

1. In a process for the treatment of a liquid-vapor hydrocarbon mixture containing a non-condensable gas obtained from a reaction zone in which hydrocarbon materials are reacted in the presence of hydrogen-containing gases at an elevated temperature and pressure in which said hydrocarbon mixture is passed to a first separation zone, a first relatively high-boiling liquid stream and a first vaporous stream are recovered from said first separation zone at an elevated temperature and pressure, said vaporous stream is cooled and passed to a second separation zone at a reduced temperature, a second relatively low-boiling liquid stream and a second gaseous stream are recovered from said second separation zone at a reduced temperature, and in which said first and second liquid streams are further treated for the purpose of separating at least a high-boiling and a low-boiling product fraction, the improvement which comprises: passing said second liquid stream in indirect heat exchange with said hydrocarbon mixture obtained from said reaction zone and passed to said first separation zone to heat said second liquid stream to an elevated temperature suitable for admixture with said first liquid stream, combining the indirectly heated second stream with the first liquid stream, passing the combined liquid stream without further heating to a steam stripping zone of a reduced pressure as the heat sipply thereto to separate a low-boiling hydrocarbon fraction from a high-boiling hydrocarbon fraction, passing steam to a lower portion of said stripping zone to strip low-boiling hydrocarbon from high-boiling hydrocarbon, and recovering said high-boiling hydrocarbon product fraction from said stripping zone without further heating thereof.

2. In a process for the treatment of a product effluent stream recovered from a hydrodesulfurization zone at an elevated temperature and pressure in which said hydrocarbon mixture is passed to a first separation zone, a first relatively high-boiling liquid stream and a first vaporous stream are recovered from said first separation zone at an elevated temperature and pressure, said vaporous stream is cooled and passed to a second separation zone at a reduced temperature, a second relatively low-boiling liquid stream and a second gaseous stream are recovered from said second separation zone at a reduced temperature, and in which said first and second liquid streams are further treated for the purpose of separating at least a high-boiling and a low-boiling product fraction, the improvement which comprises: passing said second liquid stream in indirect heat exchange with said product effluent stream to heat said second liquid stream to an elevated temperature suitable for admixture with said first liquid stream, combining the indirectly heated second stream with the first liquid stream, passing the combined liquid stream without further heating to a stripping zone of a reduced pressure as the heat supply thereto to separate a low-boiling hydrocarbon fraction from a high-boiling hydrocarbon fraction, and recovering said high boiling hydrocarbon fraction from said stripping zone without further heating thereof.

3. In a method for the recovery of normally liquid hydrocarbons from a desulfurized product effluent stream recovered at an elevated temperature and pressure from a reaction zone in which a desulfurized product effluent stream comprising vapor-liquid hydrocarbons and non-condensable gases recovered from a reaction zone at an elevated temperature and pressure are passed to a first separation zone, a first relatively high-boiling liquid stream and a first vaporous stream are recovered from said first separation zone at an elevated temperature and pressure, said vaporous stream is cooled and passed to a second separation zone at a reduced temperature, a second relatively low-boiling liquid stream and a second gaseous stream are recovered from said second separation zone at a reduced temperature, and in which said first and second liquid streams are further treated for the purpose of separating at least a high-boiling and a low-boiling fraction, the improvement which comprises: passing said desulfurized product effluent stream in parallel flow arrangement through a plurality of heat exchange steps to cool said product effluent stream to about 500° F. without substantially reducing the pressure thereof and passing the cooled effluent to said first separation zone, passing said second liquid stream in indirect heat exchange with one of said plurality of heat exchange steps hereinbefore mentioned to heat said second liquid stream to an elevated temperature suitable for admixture with said first liquid stream, combining the indirectly heated second stream with the first liquid stream, passing the combined liquid stream without further heating to a steam stripping zone of a reduced pressure as the heat supply thereto to separate a low-boiling hydrocarbon fraction from a high-boiling hydrocarbon fraction, passing steam to the lower portion of said stripping zone to strip low-boiling hydrocarbon from high-boiling hydrocarbon, and recovering said high-boiling hydrocarbon fraction from said stripping zone without further heating thereof.

References Cited by the Examiner

UNITED STATES PATENTS

| | | | |
|---|---|---|---|
| 2,064,757 | 12/36 | Keith | 196—134 |
| 2,840,513 | 6/58 | Nathan | 208—209 |
| 2,970,107 | 1/61 | Gilmore | 196—134 |

DELBERT E. GANTZ, *Primary Examiner.*

ALPHONSO D. SULLIVAN, *Examiner.*

UNITED STATES PATENT OFFICE
CERTIFICATE OF CORRECTION

Patent No. 3,206,395                        September 14, 1965

Charles E. Slyngstad et al.

It is hereby certified that error appears in the above numbered patent requiring correction and that the said Letters Patent should read as corrected below.

Column 3, line 39, for "catlysts" read -- catalysts --; line 45, for "nickel-cobalt-moylbdate" read -- nickel-cobalt-molybdate --; line 50, for "p.s.ig." read -- p.s.i.g. --; column 4, line 32, for "acual" read -- actual --; line 64, for "rotation" read -- ratio --; column 6, line 64, for "recycles" read -- recycle --; line 70, for "bppass" read -- bypass --; column 7, line 25, for "tower," read -- tower. --; line 32, for "separattor" read -- separator --; column 10, line 8, for "hours" read -- hour --; column 12, line 15, for "sipply" read -- supply --.

Signed and sealed this 7th day of June 1966.

(SEAL)
Attest:

ERNEST W. SWIDER                            EDWARD J. BRENNER
Attesting Officer                          Commissioner of Patents